United States Patent [19]

Sato

[11] Patent Number: 4,481,547
[45] Date of Patent: Nov. 6, 1984

[54] VIDEO SIGNAL PROCESSING CIRCUIT
[75] Inventor: Ichitaro Sato, Atsugi, Japan
[73] Assignee: Sony Corporation, Tokyo, Japan
[21] Appl. No.: 360,461
[22] Filed: Mar. 22, 1982
[30] Foreign Application Priority Data Apr. 6, 1981 [JP] Japan .................................. 56-51323

[51] Int. Cl.³ .......................... H04N 5/78; H04N 5/21
[52] U.S. Cl. .................................... 360/33.1; 307/542;
358/166; 358/167; 358/340; 358/330
[58] Field of Search ............... 360/33.1; 358/340, 160,
358/166, 167, 170, 330, 314, 336; 307/542, 543,
555

[56] References Cited

U.S. PATENT DOCUMENTS 3,980,815 9/1976 Kaneko ................................. 358/170
4,198,650 4/1980 Hongu et al. ................... 358/167 X
4,363,053 12/1982 Kanamoto et al. ............. 360/33.1 X Primary Examiner—Robert L. Richardson
Attorney, Agent, or Firm—Lewis H. Eslinger; Alvin Sinderbrand

[57] ABSTRACT

In a circuit for processing a video signal to be recorded, for example, in a VTR, as a frequency modulation of a relatively high frequency carrier, and in which, in advance of such frequency modulation and for the purpose of improving the signal-to-noise ratio particularly in respect to the so-called FM noise, the video signal is pre-emphasized and then clipped at a predetermined level for avoiding over-modulation; a compensating circuit responds to the pre-emphasized video signal for widening those overshoots thereof which are to be clipped and thereby avoiding waveform distortions that would otherwise occur at the locations of the clipped overshoots when the recorded signal is reproduced, frequency demodulated and then de-emphasized complementarily to the original pre-emphasis.

10 Claims, 13 Drawing Figures

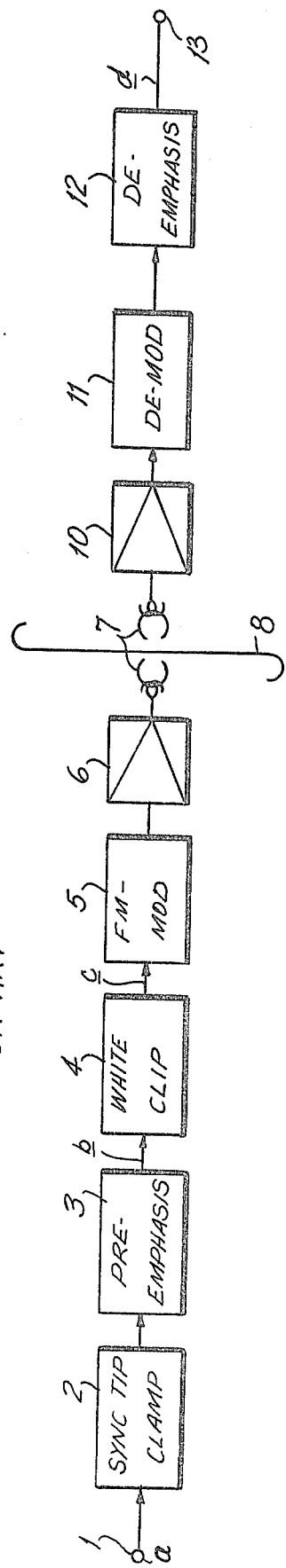
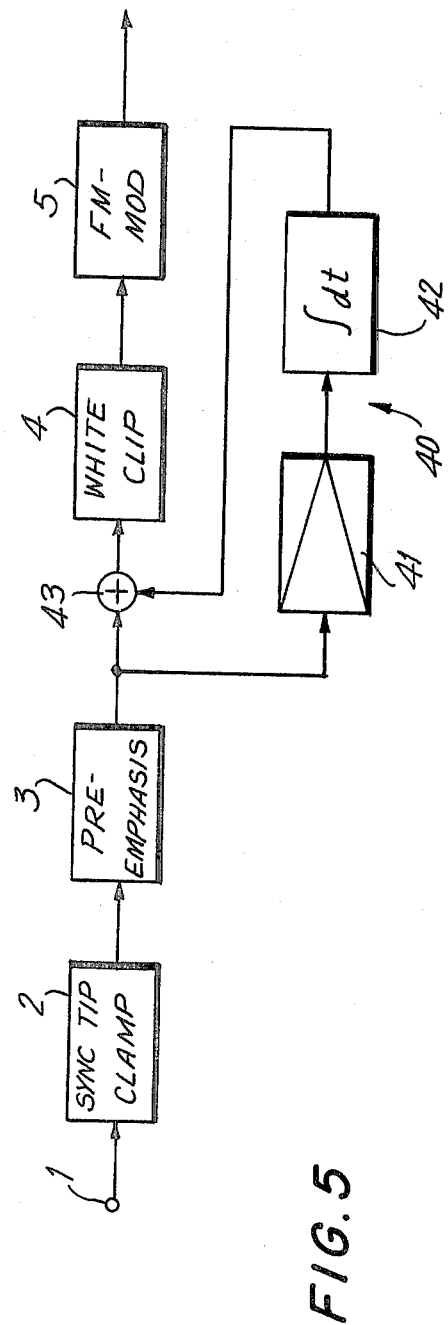
FIG. 1
PRIOR ART
FIG. 5

VIDEO SIGNAL PROCESSING CIRCUIT

BACKGROUND OF THE INVENTION

1. Field of the Invention

This invention relates generally to the recording and reproducing of information signals, such as, video signals, and more particularly is directed to the processing of such video signal so as to avoid waveform distortions thereof when magnetically recorded and reproduced.

2. Description of the Prior Art

In the recording and reproducing of video signals on magnetic tape or the like, it is well known to record the entire video signal, in the case of a monochrome or black-and-white signal, or the luminance component, in the case of a color video signal, as a frequency modulation of a relatively high frequency carrier. Further, in such recording, a high frequency portion of the video signal, which hereinafter is intended to mean either the entire monochrome video signal or the luminance component of a color video signal is pre-emphasized in a pre-emphasis circuit prior to the frequency modulation of the carrier therewith, and, in the reproducing or playback operation, the reproduced frequency modulated video signal is demodulated and then subjected to a de-emphasis which is complementary to the original pre-emphasis for reducing the so-called FM noise in the demodulated video signal. However, the pre-emphasis for improving the signal-to-noise ratio in respect to the FM noise results in overshoots, particularly at portions of the video signal where the level thereof is abruptly changed. If the pre-emphasized video signal with such large overshoots is employed as the modulating signal for the frequency modulation, the frequency shifts corresponding to such large overshoots are too great to be included in the transmission band of the apparatus, that is, the band of frequencies that can be magnetically recorded and reproduced, so that the recording and reproducing of the video signal cannot be effected with a linear characteristic. In order to bring the frequency modulated video signal, as recorded and reproduced, within the allowable transmission band, it is well known to provide the recording section of the apparatus with a clip circuit for clipping the pre-emphasized video signal at a predetermined level, particularly in respect to the white level, so that those overshoots which would result in over-modulation are clipped or removed prior to the frequency modulation. In the case of such limiting of the pre-emphasized video signal in the recording operation, when the video signal is processed in a de-emphasis circuit after demodulation during the reproducing operation, it is not possible to obtain precisely the original video signal owing to waveform distortions occurring at the locations of the limited or clipped overshoot portions.

OBJECTS AND SUMMARY OF THE INVENTION

Accordingly, it is an object of this invention to provide circuits for the processing of video or other information signals in connection with the recording and reproducing thereof, and which avoid the foregoing problems associated with the known circuits provided for that purpose.

More particularly, it is an object of this invention to provide a circuit for processing a video signal to be recorded so as to achieve an improved signal-to-noise ratio in respect to FM noise, while avoiding overmodulation and also waveform distortion.

A further object is to provide a video signal processing circuit which pre-emphasizes and then clips the signal prior to frequency modulation of a carrier therewith for recording, and in which resulting waveform distortions of the reproduced signal are substantially avoided.

In accordance with an aspect of this invention, in a circuit for processing a video signal to be recorded, for example, in a VTR, as a frequency modulation of a relatively high frequency carrier, and in which, in advance of such frequency modulation and for the purpose of improving the signal-to-noise ratio, particularly in respect to the FM noise, the video signal is pre-emphasized and then clipped at a predetermined level for avoiding over-modulation; a compensating circuit responds to the pre-emphasized video signal for widening those overshoots thereof which are to be clipped and thereby avoiding waveform distortions that would otherwise occur at the locations of the clipped overshoots when the recorded signal is reproduced, frequency demodulated and then subjected to a de-emphasis which is complementary to the original pre-emphasis.

In one embodiment of this invention, the compensating circuit includes means connected with the level clip circuit for providing a pulse indicating each overshoot of the pre-emphasized video signal beyond the predetermined level with each such pulse having an amplitude corresponding to the amount of the respective overshoot beyond the predetermined level, means for integrating each pulse so as to provide a respective widened pulse of a width corresponding generally to the amplitude of the respective overshoot indicating pulse, and means for superimposing each widened pulse on the video signal in advance of its pre-emphasis.

In another embodiment of this invention, the compensating circuit for avoiding waveform distortions includes integrating means receiving a portion of the pre-emphasized video signal and providing an integrated signal in which any overshoots of the pre-emphasized signal exceeding the predetermined level are correspondingly widened, and means for adding such integrated signal to the pre-emphasized video signal in advance of the level clipping thereof.

The above, and other objects, features and advantages of this invention, will be apparent in the following detailed description of illustrative embodiments thereof which is to be read in connection with the accompanying drawings in which the same reference numerals are employed for identifying corresponding parts in the several views of the drawings.

BRIEF DESCRIPTION OF THE DRAWINGS

FIG. 1 is a schematic block diagram illustrating signal processing circuits in an apparatus according to the prior art for recording and reproducing a video signal or the like;

FIG. 5 is a block diagram illustrating the recording section of a video recording and reproducing apparatus according to another embodiment of this invention.

DESCRIPTION OF THE PREFERRED EMBODIMENTS

Figure 2A:
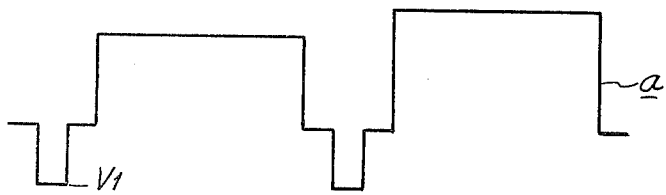
FIGS. 2A–2D are waveform diagrams to which reference will be made in explaining problems encountered with the signal processing circuits of FIG. 1.

Referring initially to FIG. 1 of the drawings for explaining in detail the problem to be overcome by this invention, it will be seen that, in the recording section of a video tape recorder (VTR) according to the prior art, a video signal a which is shown diagrammatically on FIG. 2A and, as earlier indicated, may be constituted by an entire monochrome video signal or by the luminance component of a color video signal, is fed through an input terminal 1, a clamping circuit 2, a pre-emphasis circuit 3 and a white level clipping circuit 4 to a frequency modulator 5 where it frequency modulates a suitable high frequency carrier to form an FM (frequency-modulated) signal. The FM signal is then supplied through a recording amplifier 6 to a magnetic head 7 which is conventionally rotary and which records the FM signal on a magnetic tape 8. In such recording section according to the prior art, clamping circuit 2 ensures that the sync-tip level of the video signal a is maintained constant, for example, at the level $V_1$ on FIG. 2A, so that, when the video signal a is converted to an FM signal, the sync-tip of the video signal is made to always correspond to a predetermined frequency, for example, 3.5 MHz.

Figure 2B:
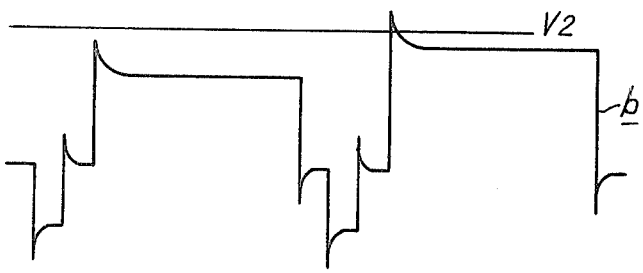
Figure 2C:
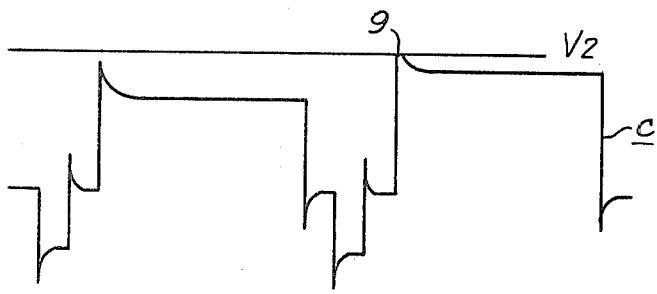

The pre-emphasis circuit 3 conventionally provides a so-called linear pre-emphasis, that is, its gain-frequency characteristic is independent of the level of the video signal. More particularly, in accordance with such gain-frequency characteristic, circuit 3 pre-emphasizes a high frequency portion of the video signal to provide a sufficient signal-to-noise ratio in the output from frequency modulator 5. However, it will be noted in FIG. 2B that the pre-emphasized video signal b at the output of circuit 3 includes overshoots at the portions of the video signal where the level of the latter is abruptly changed. If the amount of pre-emphasis imparted to the video signal by circuit 3 is sufficient to provide an adequate signal-to-noise ratio in respect to the FM noise in the output from frequency modulator 5, then the resulting overshoots of the pre-emphasized signal, particularly at the relatively high level portions of the video signal, extend beyond the white level $V_2$ established by clipping circuit 4 for avoiding over-modulation of the FM signal from frequency modulator 5. If, for example, the FM signal recorded on tape 8 is to have a minimum frequency of 3.5 MHz and a maximum frequency of 4.8 MHz respectively corresponding to the sync-tip level and the white level of the video signal applied to input terminal 1, then clamping circuit 2 is arranged to suitably clamp the sync-tip level of the incoming signal at a level $V_1$ (FIG. 2A) which corresponds to the minimum frequency 3.5 MHz at the output of frequency modulator 5, and the gain of the video signal a applied to input terminal 1 is selected so that the level difference between the sync-tip level and the white level of the video signal will correspond to the desired frequency deviation of 1.3 MHz between the mimimum and maximum frequencies of the FM signal issuing from modulator 5. White clipping circuit 4 is then made operative to clip or remove from the output signal c thereof, as at 9 on FIG. 2C, any portion or overshoot of the pre-emphasized signal b extending beyond the clipped level $V_2$ which, in the foregoing example, corresponds to a frequency of 4.8 MHz at the output of modulator 2.

In the reproducing section of the known VTR shown on FIG. 1, magnetic head 7 reproduces the recorded FM signal from tape 8, and the resulting reproduced FM signal is supplied through a reproducing amplifier 10 to a frequency demodulator 11. The demodulated output of frequency demodulator 11 is supplied through a de-emphasis circuit 12 to an output terminal 13, with the circuit 12 providing a so-called linear de-emphasis with a characteristic substantially complementary to that of the pre-emphasis circuit 3 of the recording section. Thus, circuit 12 substantially de-emphasizes high frequency components of the demodulated signal and, since the FM noise from modulator 5 is, for the most part, in the high frequency range, the pre-emphasis circuit 3 and de-emphasis circuit 12 combine to substantially improve the signal-to-noise ratio in respect to the FM noise in the reproduced signal obtained at output terminal 13.

Figure 2D:
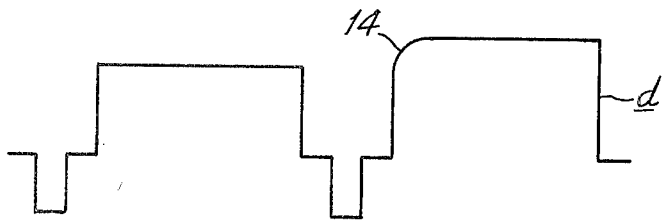

However, at each location 9 on the clipped video signal c (FIG. 2C) where clipping circuit 4 clipped an overshoot of the pre-emphasized signal b (FIG. 2B), the reproduced video signal d obtained at output terminal 13, after its demodulation and de-emphasis, will have a corresponding distortion, for example, as indicated at 14 on FIG. 2D, which results in smearing of the resultant picture.

Generally, in accordance with this invention, such waveform distortions resulting from overshoots of the pre-emphasized signal extending beyond the white clipping level are compensated by providing the signal processing circuit of the recording section with means responsive to the output of the pre-emphasizing circuit 3 for widening those overshoots of the pre-emphasized signal as applied to the white clipping circuit 4, with the extent to which the clipped overshoots are widened depending upon the amount that the clipped overshoots extended beyond the predetermined or white clipping level.

Figure 3:
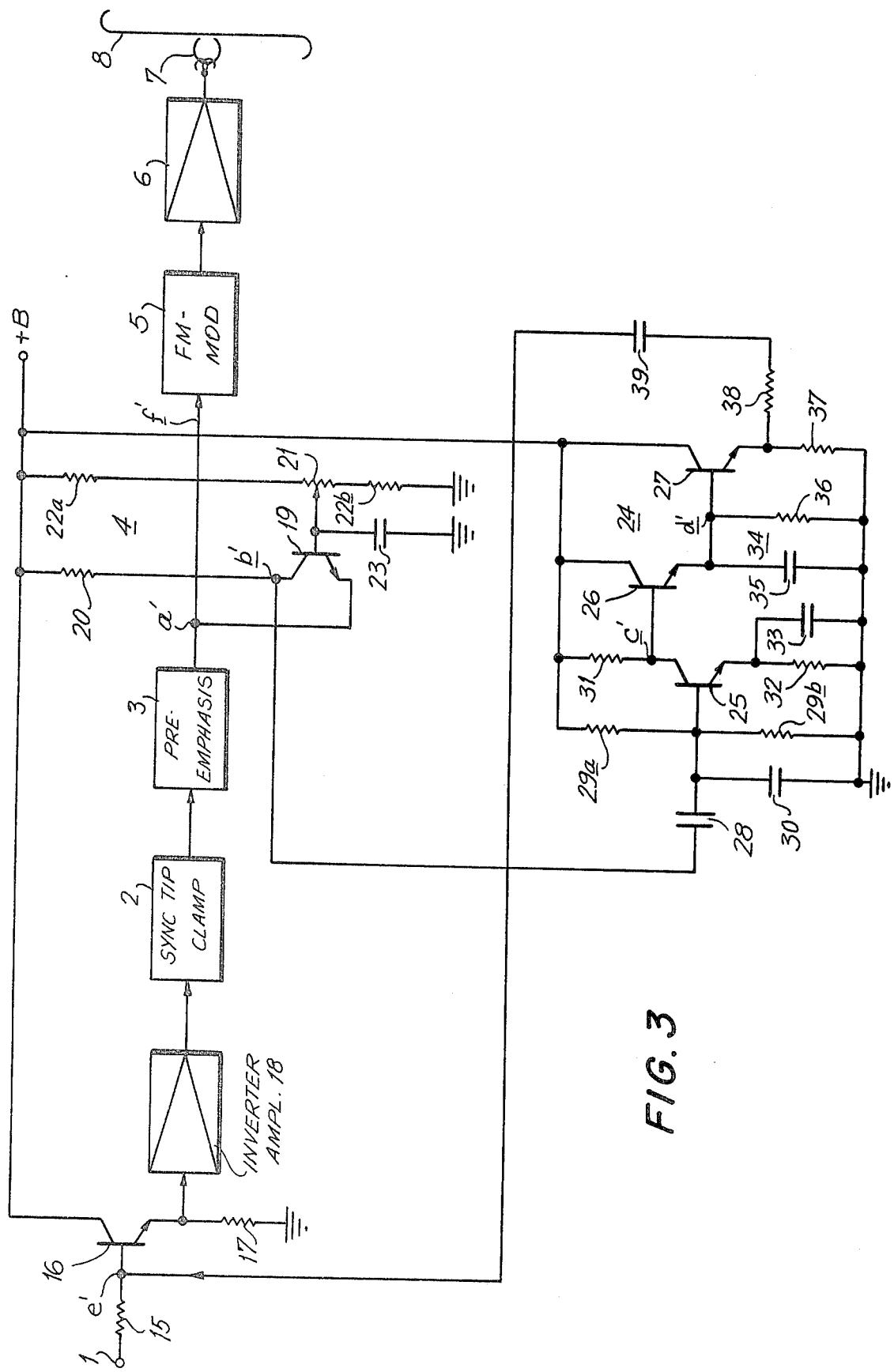
FIG. 3 is a circuit diagram of the recording section of a video signal recording and reproducing apparatus having signal-processing circuits according to an embodiment of the present invention.

Referring in detail to FIG. 3, it will be seen that, in the recording section of a video signal recording and reproducing apparatus according to a first embodiment of this invention, the video signal to be recorded is applied through an input terminal 1 and a resistor 15 to the base electrode of a buffer transistor 16 which has its collector connected to a power supply source +B and its emitter connected through a resistor 17 to ground. The output of buffer transistor 16 is applied from its emitter to an inverting amplifier 18 and the resulting inverted video signal is applied from the output of amplifier 18 to a sync-tip clamping circuit 2 and a pre-emphasis circuit 3, in succession. The sync-tip clamping circuit 2 and pre-emphasis circuit 3 of FIG. 3 operate similarly to the correspondingly numbered circuits in FIG. 1 so that the inverted video signal a' obtained at the output of pre-emphasis circuit 3 on FIG. 3 has its sync-tip level maintained constant, and contains overshoots at the portions of the video signal where the level is abruptly changed. Such pre-emphasized signal a' is supplied through a white clipping circuit 4 to a frequency modulator 5, and the resulting FM signal is supplied through a recording amplifier 6 to a rotary head 7 by which it is recorded on magnetic tape 8.

In the embodiment of the invention illustrated on FIG. 3, white clipping circuit 4 includes a transistor 19 having its collector connected through a load resistor 20 with power supply source +B, while the emitter of transistor 19 is connected to the output of pre-emphasis circuit 3. Further, the base of transistor 19 is connected to a movable tap of a variable resistor 21 which includes a resistance element connected, at its ends, through resistors 22a and 22b with power supply source +B and ground, respectively. The white clipping level $V'_2$ of circuit 4 is determined or established by adjustment of variable resistor 21. The illustrated white clipping circuit 4 is completed by a smoothing condenser 23 connected between the base of transistor 19 and ground.

It will be appreciated that, when the output signal a' of pre-emphasis circuit 3 is applied to the emitter of transistor 19, the latter is non-conductive or turned OFF so long as the level or voltage of such signal a' is higher than the clipping level $V'_2$ established by variable resistor 21. However, when the voltage of signal a' applied to the emitter of transistor 19 falls below the voltage determined by variable resistor 21 and by the threshold voltage $V_{BE}$ of transistor 19, the latter becomes conductive or is turned ON so as to elevate the voltage at the output of pre-emphasis circuit 3 to the level $V'_2$. In other words, clipping circuit 4 of FIG. 3 is operative to clip or remove from the pre-emphasized signal being supplied to frequency modulator 5 any portion or overshoot of such inverted signal a' which extends below the clipping level.

Figure 4A:
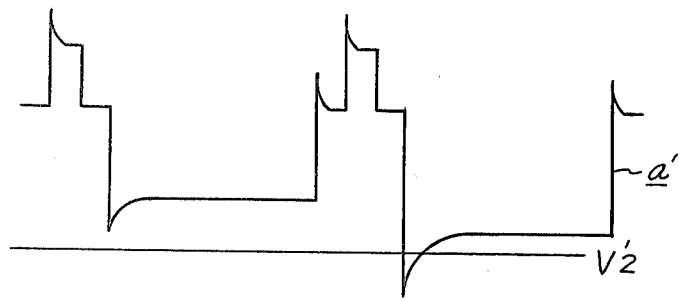
FIGS. 4A–4F are waveform diagrams to which reference will be made in explaining the operation of the signal-processing circuits of FIG. 3.
Figure 4B:

In accordance with the present invention, the video signal processing circuit of FIG. 3 further comprises a waveform distortion compensating circuit 24 which generally includes first, second and third transistors 25, 26 and 27 connected as shown. More particularly, transistor 25, which constitutes an inverter, has its base connected through a condenser 28 with the collector of transistor 19. Each time transistor 19 is turned ON in response to the voltage of the inverted pre-emphasized signal a' being lower than the clipping level $V'_2$, a corresponding inverted pulse b' (FIG. 4B) is applied through condenser 28 to the base of inverting transistor 25. A voltage divider made up of resistors 29a and 29b in series is connected between power supply source +B and ground and has its junction between resistors 29a and 29b connected to the base of transistor 25 which is also connected to ground through a condenser 30. A load resistor 31 is connected between power supply source +B and the collector of transistor 25, and the emitter of the latter is connected to ground through a resistor 32 and condenser 33 in parallel with each other.

Figure 4C:
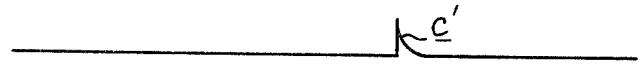
Figure 4D:
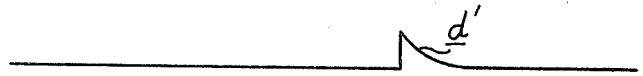

It will be appreciated that transistor 25, by reason of its foregoing connections, is operative to provide, at its collector, a pulse c' (FIG. 4C) which is an inverted replica of the pulse b' and which similarly has an amplitude corresponding to the amount by which the respective clipped overshoot of the pre-emphasized inverted signal a' had extended beyond the clipping level $V'_2$. Such inverted pulse c' is applied to the base of transistor 26 which has its collector connected to power supply source +B and its emitter connected to an integrating circuit 34 constituted by a condenser 35 and resistor 36 connected in parallel between the emitter of transistor 26 and ground. Transistor 26 and integrator 34 are operative to provide, at the emitter of transistor 26, a pulse d' (FIG. 4D) which is widened relative to the respective pulse c' by an amount corresponding to the amount the respective overshoot or portion of inverted signal a' was clipped by white clipping circuit 4. The widened pulse d' is applied to the base of transistor 27 which has its collector connected to power supply source +B and its emitter connected through a resistor 37 to ground, and through a resistor 38 and condenser 39, in series, to a junction between resistor 15 and the base of buffer transistor 16.

Figure 4E:
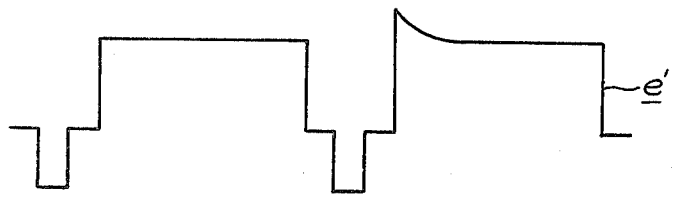

Thus, transistor 27, resistor 38 and condenser 39 act to feed back the widened pulse d' to the input of the signal processing circuit where such widened pulse d' is superimposed on the original video signal to provide the modified waveform signal e' shown on FIG. 4E. Such waveform signal e' is processed in the manner described above, that is, it is inverted in amplifier 18, has its sync-tip clamped in circuit 2, is pre-emphasized in circuit 3 and is clipped in circuit 4. As a result of the foregoing, at the output of clipping circuit 4, there is obtained a modified clipped signal f' (FIG. 4F) which, at each location where the signal has been clipped in response to an overshoot extending beyond the clipping level $V'_2$, the signal has been widened, as indicated in full lines at 9' on FIG. 4F. The foregoing may be compared with the relatively narrow clipped portion indicated in broken lines at 9 on FIG. 4F and which corresponds to the clipped portion 9 in FIG. 2C when the compensation waveform distortion according to this invention is not effected. Finally, the modified or compensated clipped signal f' frequency modulates a suitable carrier in modulator 5 and the resulting FM signal is conventionally applied through recording amplifier 6 to rotary head 7 for recording on magnetic tape 8.

Figure 4F:
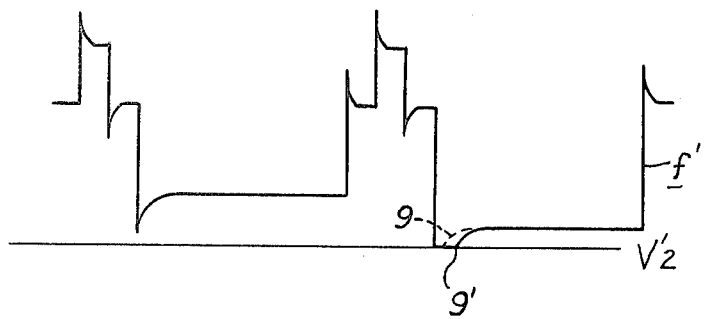

Thereafter, in a recording and reproducing apparatus having its recording section provided with a signal processing circuit according to this invention as described above with reference to FIG. 3, the FM signal recorded on tape 8 can be reproduced by means of a reproducing section similar to that of the prior art shown on FIG. 1, but in which there is further provided an inverting amplifier (not shown) so that the reproduced video signal obtained at the output of the reproducing section is restored to its normal orientation shown on FIG. 2A. It will be appreciated that, the widening of each clipped portion of the recorded video signal, as at 9' on FIG. 4F, is effective, upon reproducing of the recorded signal, to substantially compensate for the waveform distortion indicated at 14 on FIG. 2B, and to avoid the smearing of the reproduced picture which would otherwise result from the clipping of those overshoots of the pre-emphasized signal extending beyond the white clipping level.

In the embodiment of the invention described above with reference to FIG. 3, the compensation for waveform distortion is applied by means of a closed-up loop arrangement, that is, the widened pulse which corresponds, in its width, to the amount of the respective overshoot of the pre-emphasized signal clipped or removed in white clipping circuit 4, is fed back from compensating circuit 24 to the input of the video signal processing circuit so as to be also acted upon by the sync-tip clamping circuit 2 and the pre-emphasis circuit 3. However, as shown in FIG. 5, a video signal processing circuit according to another embodiment of this invention may effect compensation for waveform distortion by means of an open loop arrangement.

More particularly, in the embodiment of FIG. 5, the waveform distortion compensating circuit 40 provided in accordance with this invention includes an amplifier 41 through which a portion of the output of pre-emphasis circuit 3 is supplied to an integrating circuit 42 and the output of the latter is applied to one input of an adding or mixing circuit 43 which, at its other input, recieves the pre-emphasized video signal from circuit 3. The integrating circuit 42 is effective to increase the width, without increasing the height or amplitude, of each of the overshoot portions of the portion of the pre-emphasized video signal received from circuit 3 so that the output of adding circuit 43 will have its overshoot portions similarly widened. Such output of adding circuit 43 is then applied to white clipping circuit 4 so that, in the clipped output of the latter applied to frequency modulator 5, at least the overshoot portions which are clipped at the white clipping level will be relatively widened for affording the desired compensation which essentially avoids the waveform distortion shown on FIG. 2D when the recorded FM signal is eventually reproduced, demodulated and subjected to de-emphasis complementary to that of the pre-emphasis circuit 3.

It will be appreciated that, in the embodiment of FIG. 5 as well as in the embodiment of FIG. 3, the mentioned compensation for waveform distortion is of a dynamic character, that is, the extent to which each clipped overshoot portion of the pre-emphasized signal is widened in integrating circuit 42 corresponds to the amount of the overshoot that is clipped, that is, the amount that the overshoot resulting from the pre-emphasis extends beyond the white clipping level.

Having described illustrative embodiments of the present invention with reference to the accompanying drawings, it is to be understood that the invention is not limited to those precise embodiments, and that various changes and modifications can be effected therein by one skilled in the art without departing from the scope or spirit of the invention as defined in the appended claims.

What is claimed is:

1. An apparatus for processing a video signal comprising:
  pre-emphasizing means acting on a video signal for providing a pre-emphasized video signal as an output therefrom;
  level clip means for clipping said pre-emphasized video signal at a predetermined level; and
  means compensating for any waveform distortions of the output of said clip means that result from said output of the pre-emphasizing means being beyond said predetermined level including means connected with said level clip means for providing a pulse indicating each overshoot of said pre-emphasized video signal beyond said predetermined level with each said pulse having an amplitude corresponding to the amount of the respective overshoot beyond said predetermined level, means for integrating each said pulse so as to provide a respective widened pulse of a width corresponding generally to said amplitude of the respective overshoot indicating pulse, and means for superimposing each said widened pulse on the video signal in advance of said pre-emphasizing means.

2. An apparatus according to claim 1; further comprising inverting means acting on said video signal in advance of said pre-emphasizing means; and in which said means compensating for waveform distortions further includes means for changing the polarity at each said overshoot indicating pulse in advance of the integration thereof, and each said widened pulse is superimposed on said video signal in advance of said inverting means.

3. An apparatus according to claim 2; in which said level clip means includes a clipping transistor having a collector-emitter path connected in series with a load resistor between a power supply source and said output of the pre-emphasizing means, and a clip-level adjusting resistor connected between said power supply source and ground and having a movable tap connected to the base of said clipping transistor so that each said overshoot indicating pulse is derived from the connection of said collector-emitter path with said load resistor.

4. An apparatus according to claim 3; in which said level clip means further includes smoothing condenser means connected between said base of the clipping transistor and ground.

5. An apparatus according to claim 2; further comprising input means receiving said video signal and each said widened pulse to be superimposed thereon, and buffer means through which said video signal and each said widened pulse superimposed thereon are applied to said inverting means.

6. An apparatus for processing a video signal comprising:
  pre-emphasizing means acting on a video signal for providing a pre-emphasized video signal as an output therefrom;
  level clip means for clipping said pre-emphasized video signal at a predetermined level; and
  means compensating for any waveform distortions of the output of said clip means that result from said output of the pre-emphasizing means being beyond said predetermined level including integrating means receiving a portion of said output of the pre-emphasizing means and providing an integrated signal in which any overshoots of said pre-emphasized video signal exceeding said predetermined level are widened, and means for adding said integrated signal to said pre-emphasized video signal in advance of said level clip means.

7. An apparatus for processing a video signal comprising:
  pre-emphasizing means acting on a video signal for providing a pre-emphasized video signal as an output therefrom;
  level clip means for clipping said pre-emphasized video signal at a predetermined level; and
  means compensating for any waveform distortions of the output of said clip means that result from said output of the pre-emphasizing means being beyond said predetermined level including means responsive to said output of the pre-emphasizing means to provide the video signal, as applied to said clips means, with overshoots which are widened at least to the extent that said overshoots are beyond said predetermined level.

8. An apparatus according to claim 7; further comprising means acting on said video signal in advance of said pre-emphasizing means for clamping a sync-tip level of said video signal at a constant level.

9. An apparatus according to claim 7; further comprising frequency modulating means for frequency modulating a carrier with said output of the clip means which, by means of said predetermined level, prevents over-modulation of said carrier.

10. An apparatus according to claim 10; further comprising means for recording the frequency modulated carrier on a magnetic tape, means for reproducing said frequency modulated carrier as a reproduced signal from said tape, frequency demodulating means receiving said reproduced signal and demodulating a reproduced video signal therefrom, and de-emphasizing means acting on said reproduced video signal to de-emphasize the latter complementarily in respect to said pre-emphasizing means.

* * * * *